(12) United States Patent
Connors et al.

(10) Patent No.: US 7,155,777 B2
(45) Date of Patent: Jan. 2, 2007

(54) CLOSURE MECHANISM FOR HINGED DEVICES

(75) Inventors: William M. Connors, Lexington, KY (US); Donald N. Spitz, Lexington, KY (US); Gregory P. Washnock, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 90 days.

(21) Appl. No.: 10/883,120

(22) Filed: Jun. 30, 2004

(65) Prior Publication Data

US 2006/0000056 A1    Jan. 5, 2006

(51) Int. Cl.
*E05F 3/14* (2006.01)
*E05F 1/08* (2006.01)

(52) U.S. Cl. .............. 16/65; 16/289; 16/286; 16/60; 49/386; 292/121; 355/75

(58) Field of Classification Search ............ 16/65, 16/70, 286, 289–292, 296–297, 362–364, 16/374, 60, 343–346; 49/386, 387, 386 X; 292/95, 121 X, 126, 128, 219, DIG. 61; 312/324, 326, 329, 295, 223.1, 319.5, 319.6, 312/319.8; 361/680–683; 296/76; 355/75, 355/40, 75 X; 358/497, 474; 399/379–380
See application file for complete search history.

(56) References Cited

U.S. PATENT DOCUMENTS

| | | | | |
|---|---|---|---|---|
| 1,357,655 A | * | 11/1920 | Sandell | 217/60 C |
| 1,535,024 A | * | 4/1925 | Kranz et al. | 134/71 |
| 2,664,590 A | * | 1/1954 | Allen | 16/65 |
| 2,779,069 A | * | 1/1957 | Ziesmer | 49/248 |
| 2,823,661 A | * | 2/1958 | Grannan | 126/191 |
| 3,615,134 A | | 10/1971 | Newcomb | |
| 3,665,958 A | * | 5/1972 | Dunkelis | 137/522 |
| 3,997,265 A | | 12/1976 | Menon et al. | |
| 4,040,615 A | | 8/1977 | Kurosaki | |
| 4,093,377 A | | 6/1978 | Tsuda | |
| 4,172,660 A | | 10/1979 | Yanofsky et al. | |
| 4,621,391 A | * | 11/1986 | Leonard | 16/299 |
| 4,706,333 A | * | 11/1987 | Lauderbach | 16/289 |
| 4,742,598 A | * | 5/1988 | Bruneau | 16/286 |
| 5,036,354 A | | 7/1991 | Miyamoto | |
| 5,301,469 A | * | 4/1994 | Lyons, Sr. | 49/386 |
| 5,363,184 A | | 11/1994 | Matsuo et al. | |
| 5,401,096 A | * | 3/1995 | Stang | 312/319.2 |

(Continued)

FOREIGN PATENT DOCUMENTS

JP          07169256 A  *  7/1995

(Continued)

*Primary Examiner*—Chuck Y. Mah
(74) *Attorney, Agent, or Firm*—Douglas E. Erickson (57) ABSTRACT

A closure mechanism for hinged devices having an upper member and a lower member. The closure mechanism includes a track disposed on the upper member and at least one support arm pivotally attached to the lower member. A biasing element is adapted to urge the support arm to engage the upper member and urge it to pivot to an open configuration. The arm includes a contact element that engages the track such that an upper end of the arm moves along the track as the upper member pivots to an open position. The arm includes a hook that engages a positive stop to prevent over-rotation of the arm. In other embodiments of the closure mechanism, the arm is pivotally attached to the upper member and moves against the lower member, and the biasing element extends between the arm and either the upper member or the lower member.

3 Claims, 11 Drawing Sheets

U.S. PATENT DOCUMENTS

| | | |
|---|---|---|
| 5,470,051 A | 11/1995 | Morigami et al. |
| 5,481,333 A | 1/1996 | Leonhart |
| 5,541,712 A | 7/1996 | Fujitaka et al. |
| 5,574,542 A | 11/1996 | Brook, III |
| 5,621,501 A | 4/1997 | Matsuo et al. |
| 5,971,514 A * | 10/1999 | Hayakawa ............... 312/319.2 |
| 6,100,963 A | 8/2000 | Hosaka |
| 6,230,364 B1 * | 5/2001 | Cheal ........................ 16/289 |
| 6,363,576 B1 | 4/2002 | Hsu et al. |
| 6,456,365 B1 | 9/2002 | Hosaka et al. |
| 6,494,631 B1 | 12/2002 | Mastinick |
| 6,557,300 B1 * | 5/2003 | Bantle ........................ 49/137 |
| 6,593,999 B1 | 7/2003 | Hosaka |
| 6,690,910 B1 | 2/2004 | Fujimoto |
| 2003/0056324 A1 | 3/2003 | Yazawa et al. |
| 2004/0032578 A1 | 2/2004 | Chen |

FOREIGN PATENT DOCUMENTS

| | | | |
|---|---|---|---|
| JP | 09044947 A | * | 2/1997 |
| JP | 09146534 A | * | 6/1997 |
| JP | 2001220944 A | * | 8/2001 |
| JP | 2001279994 A | * | 10/2001 |
| WO | WO 9604448 A1 | * | 2/1996 |

* cited by examiner

CLOSURE MECHANISM FOR HINGED DEVICES

FIELD

The present invention relates generally to closure mechanisms and, more particularly, to a closure mechanism for a scanner assembly of an all-in-one device.

BACKGROUND

All-in-one ("AIO") devices are popular because they provide printing, copying, scanning and facsimile capabilities in a single unit. AIO devices may be connected to a host computer, or a network, or may operate in a standalone mode.

AIO devices require periodic replenishment of consumables, such as ink or toner cartridges, cleaning webs and media such as paper. Accordingly, there is a need to provide convenient access to remove depleted consumables and install replacements, as well as remove foreign objects from the AIO device. Since AIO devices are consumer items, they are often serviced by users having little or no technical knowledge of the AIO device. Thus, there is a need to provide users with the capability to access the replenishment points of the printer easily.

A common occurrence with printers, including the printer component of an AIO device, is jamming due to misfeeding of a sheet of media from an associated storage tray. Sheets of media in a storage tray may stick together, causing several sheets to be fed from the tray at once and jamming. Thus, there is a need to access certain portions of the AIO device to clear jammed media or foreign objects from the paper and carrier paths.

AIO devices are typically constructed with an upper portion having a platen, an original cover pivotally disposed over the platen, and a scanner for digitizing an original placed on the platen. A lower printer portion of the AIO device typically includes a media storage tray, a transport mechanism, ink or toner cartridges and other components to facilitate printing onto a medium such as paper. It is desirable to connect the scanner portion to the printer portion by a hinge, allowing a user to pivot the scanner portion away from the printer portion, preferably upwardly, to gain access to consumables and clear jammed media or foreign objects from the paper and carrier paths.

However, the weight of the scanner portion requires that some form of assistance be provided to allow a user to pivot the scanner portion easily from a closed position proximate the printer portion to an open position away from the printer portion. There is also a need to support the scanner portion while it is in the open position so that the user may have both hands free to service the printer.

Cover closer mechanisms exist that offer potential solutions to the assistance and support of a scanner portion of an AIO device. Example cover closers are disclosed in U.S. Pat. No. 5,541,712 to Fujitaka et al., U.S. Pat. No. 6,100,963 to Hosaka, U.S. Pat. No. 6,363,576 to Hsu et al., and U.S. Pat. No. 6,456,365 to Hosaka et al. However, for various reasons these and other cover closers cannot be satisfactorily used or adapted for use as assist and support mechanisms for the scanner component of an AIO device. For example, a scanner portion is typically much heavier than a cover closer, making many cover closers unwieldy for use with a scanner portion due to the correspondingly heavy-duty components that would be required to support the added weight of the scanner portion.

In addition, cover closers typically provide means for elevating the cover above the platen to accommodate a thick original. This feature is undesirable for use with a scanner portion, since the elevation means would make the scanner portion unstable when in an open position. Further, the arrangement of the components of many cover closers make them unsuitable for adaptation for use with a scanner portion because the components could intrude into the printer portion and reduce the serviceability of the AIO device. Another drawback of cover closers is their relatively high cost and complexity due to the wide range of motion needed to access the platen and the high repetitive-motion duty cycle requirement of the cover closer, which is operated many times over the life of the AIO Device. In contrast, a scanner portion support is operated only when access to consumables is needed. A scanner portion is also operable with a relatively limited range of motion as compared to that required for a cover closer.

A pivotable rod or brace is frequently utilized in hinged devices to provide support. With this type of support the rod is pivotally attached to a lower portion of the device, proximate a corner away from the hinge. The user pivots an upper portion of the hinged device upwardly, then moves the rod from a generally horizontal stowed position to a generally vertical support position while holding the scanner. A free end of the rod is inserted into an opening or catch of the upper portion, thus holding the upper portion in an open position. To close the upper portion, the user must raise it slightly to release the rod, pivot the rod to the stowed position, then gently pivot the upper portion to its closed position atop the lower portion. This type of support mechanism suffers from several drawbacks. For example, such supports do nothing to assist in the opening and closing of the upper portion. Further, rod supports can be inconvenient for the user, who must hold the scanner open with one hand while positioning the rod with the other hand. Also, if the support rod is improperly engaged to the opening or catch there is a risk that the rod will slip, with the potential to cause damage to the AIO device and injury to the user. In addition, the position of the raised rod can block the user's access to consumables.

Accordingly, there is a need for an assist and support mechanism capable of compensating for the weight of a scanner portion of an AIO device when the scanner portion is opened and closed, and supporting the scanner portion when it is in an open position. There is also a need for an assist and support mechanism that does not interfere with a user's access to consumables, and for an assist and support mechanism that is relatively simple and inexpensive.

SUMMARY

The present invention is a closure mechanism for an AIO device having a scanner portion pivotally attached to a printer portion to provide a user with access to consumables for maintenance. When the AIO device is opened by a user, the scanner portion is pivoted away from the printer portion and a pair of support arms pivot in a direction opposite to that of the scanner assembly by biasing means, such as a torsion spring and a compression spring. As the user opens the scanner portion, the user initially must support at least some of the weight of the scanner portion. After the scanner portion is pivoted to a predetermined angle relative to the printer portion, the biasing means of the support arms overcomes the weight of the scanner portion and will pivot it to an open position without further assistance from the user. The invention preferably includes a positive stop, such as hooks on the support arms, to prevent over-rotation of the scanner portion. In a preferred embodiment, the biasing element includes a torsion spring sized to support the weight of the scanner portion in an open position. The scanner base preferably includes a track shaped to receive a contact element of the support arm, preferably to provide a consistent path for the contact element and support arm as the scanner element pivots.

Further features of the inventive embodiments of the present invention will become apparent from the following description, the accompanying drawings and the appended claims.

DETAILED DESCRIPTION

Figure 1A:
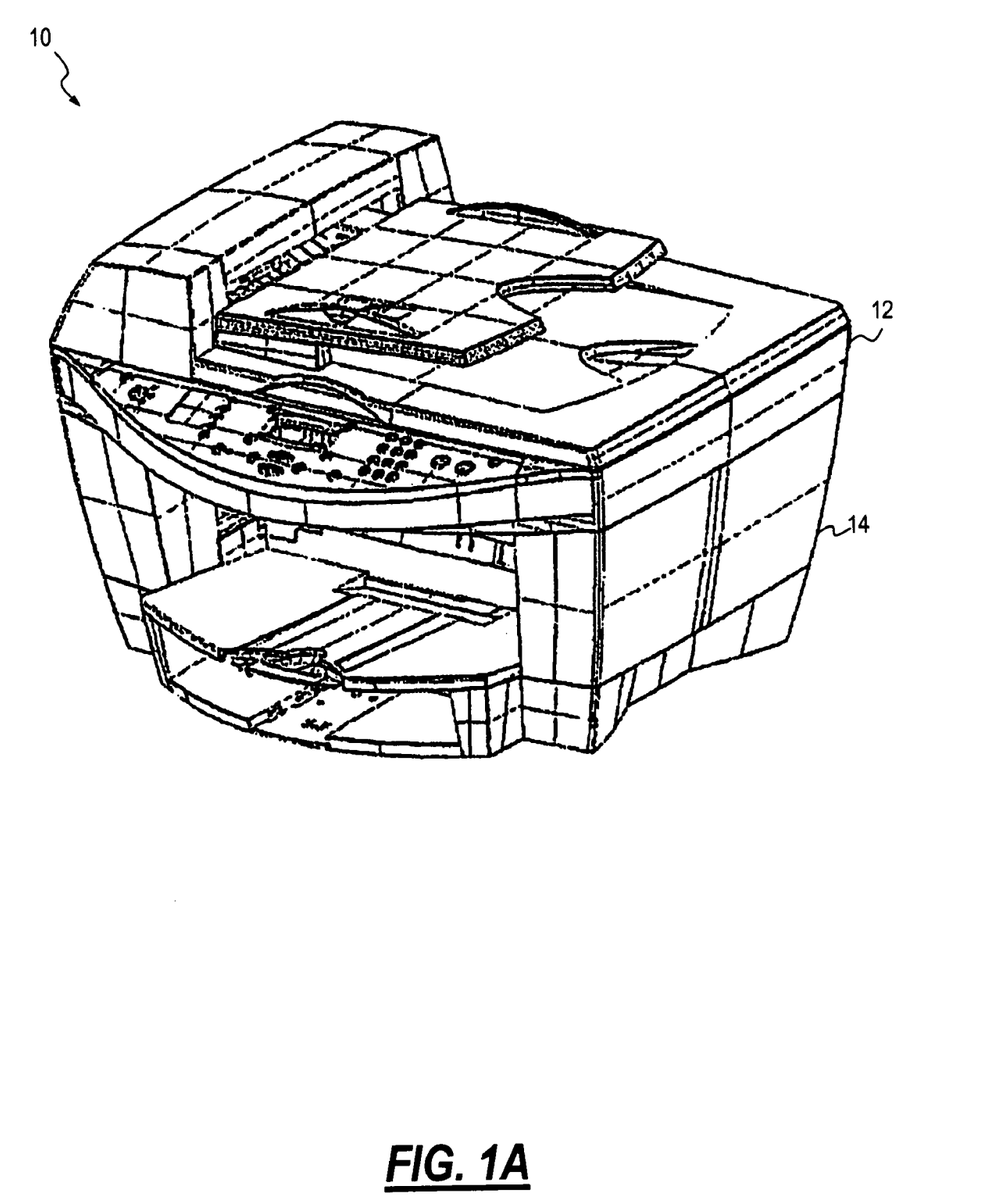
FIG. 1A is a perspective view of the general arrangement of a typical all-in-one device.
Figure 1B:
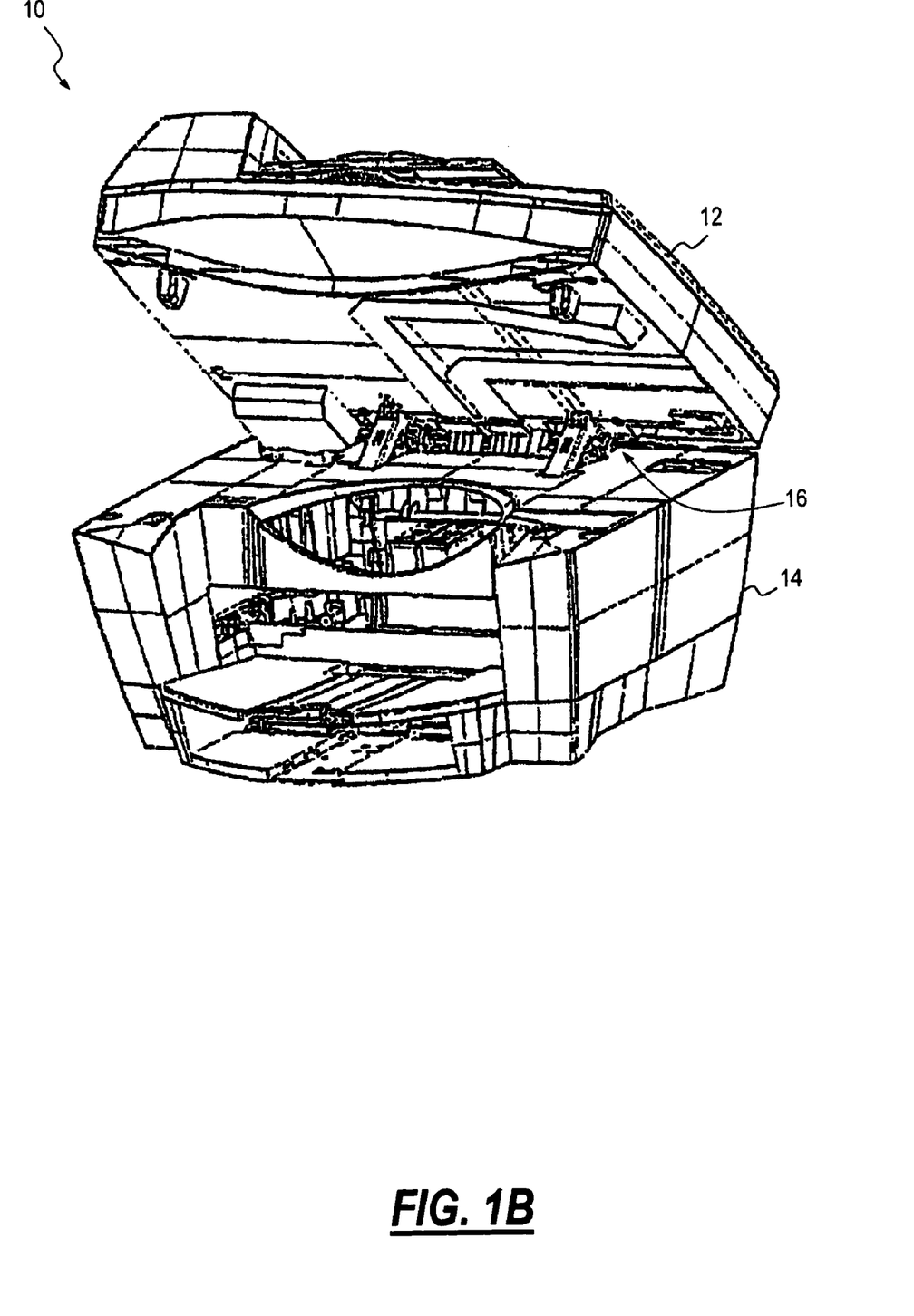
FIG. 1B is a perspective view of the all-in-one device of FIG. 1, showing a scanner portion pivoted to an open position.

A typical AIO device 10 is depicted in FIGS. 1A and 1B and includes an upper scanner portion 12 and a lower printer portion 14. Scanner portion 12 is pivotally attached to the rear of printer portion 14 by hinge 16, allowing the scanner portion to be pivoted from a closed position adjacent the printer portion, as shown in FIG. 1A, to an open position, as shown in FIG. 1B.

Figure 2A:
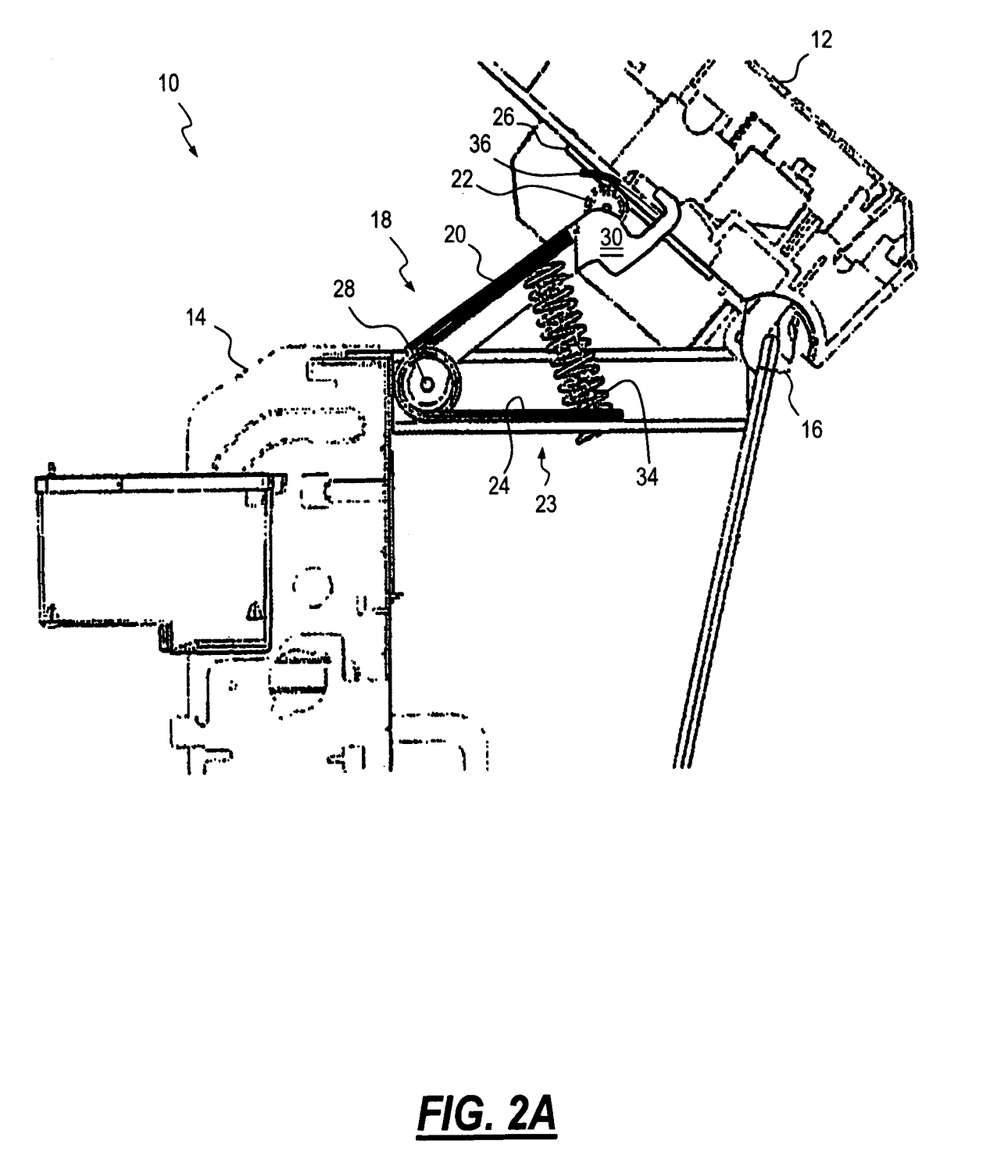
FIG. 2A is a side elevational view of a closure mechanism of the present invention in an open position according to an embodiment of the present invention.
Figure 2B:
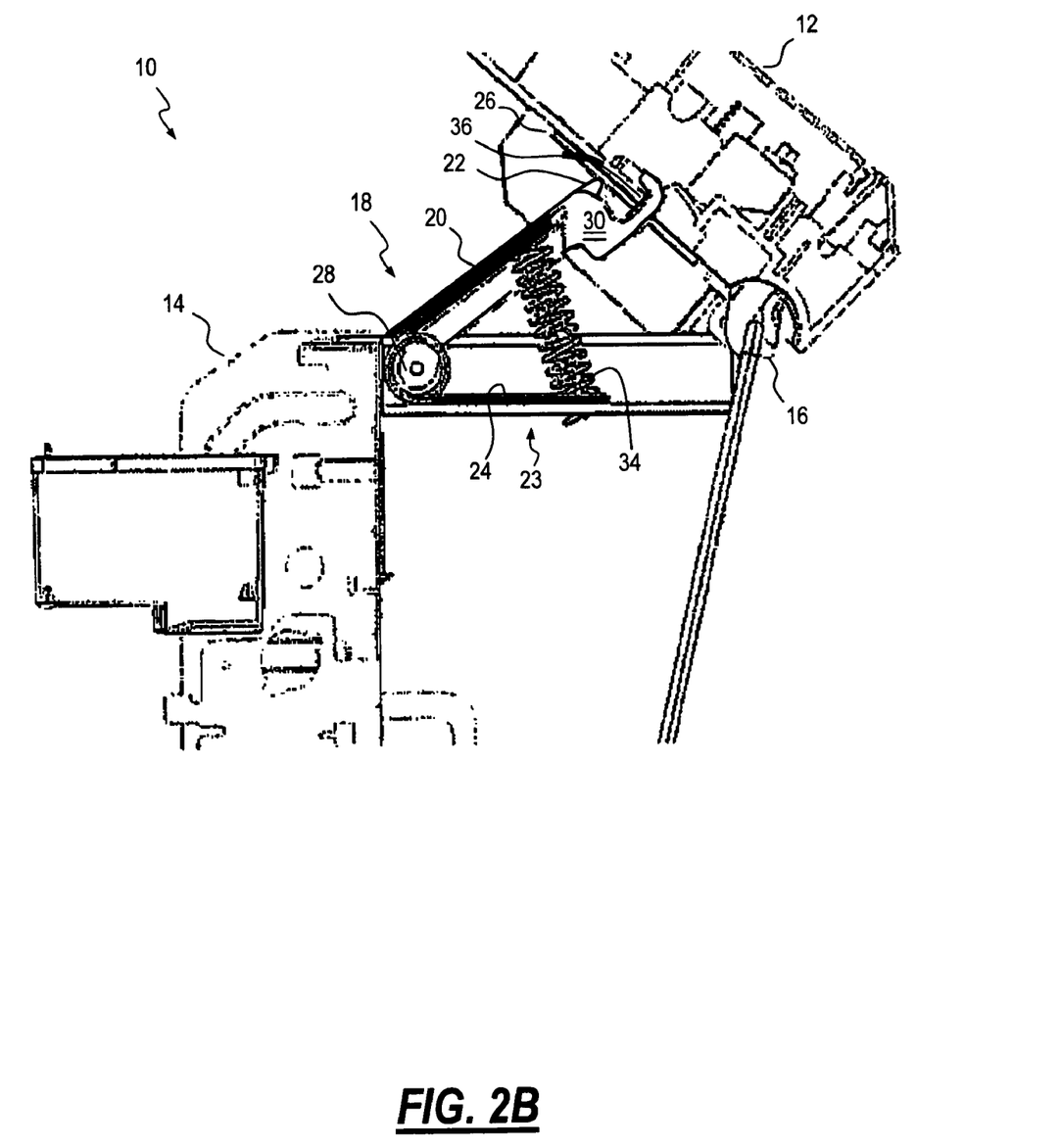
FIG. 2B is a side elevational view of a closure mechanism of the present invention in an open position according to an alternate embodiment of the present invention.

A closure mechanism, generally designated 18, and herein termed "support" for convenience, is shown in FIGS. 2A and 2B according to an embodiment of the present invention. Support 18 comprises a support arm 20, a contact element 22, a biasing element 23 preferably including at least one of a torsion spring 24 and a coil spring 34, and a track 26.

Support arm 20 includes a pivot 28 at one end and a hook portion 30 at an opposing end, and is attached to torsion spring 24. Support arm 20 is hinged about pivot 28 such that the support arm is pivotally attached to printer portion 14 and oriented generally perpendicular to hinge 16. In this embodiment, support arm 20 pivots in a direction of rotation opposite that of the scanner portion 12 as it pivots about hinge 16. It should be noted that support arm 20 may be formed in any desired shape appropriate to the geometry of a particular hinged device such as AIO device 10, including variations in length, width, cutouts, bends, openings, gaps and tabs to accommodate the hinged device and any proximate components. Support arm 20 may be made from any suitable materials including, without limitation, metals, plastics and composite materials, and may be hardened and finished or coated in any conventional manner.

Contact element 22 is attached to a free end of support arm 20 proximate hook portion 30 in any conventional manner including, without limitation, a rivet, pin, fastener, screw and link. Contact element 22 may be a roller element (as shown in FIGS. 2A, 3, 4 and 7) or may be a sliding element, as shown in FIG. 2B. Contact element 22 may be made from any suitable materials such as, for example, metals, plastics and composite materials, and may be hardened and finished or coated in any conventional manner. Contact element 22 may optionally include at least one groove 32 (see FIG. 4).

Torsion spring 24 is coupled to printer portion 14 and support arm 20, and is adapted to urge the support arm away from the printer portion. Track 26 is formed on an underside of scanner portion 12 and faces support arm 20. Track 26 includes one or more generally longitudinal projections from scanner portion 12, and may be an integral molded or machined feature of the scanner or may be separate elements attached to the scanner portion.

With continued reference to FIGS. 2A and 2B, a compression coil spring 34 may optionally be attached to and extend between printer portion 14 and support arm-20 and oriented to pivot the support arm away from the printer portion.

Figure 3:
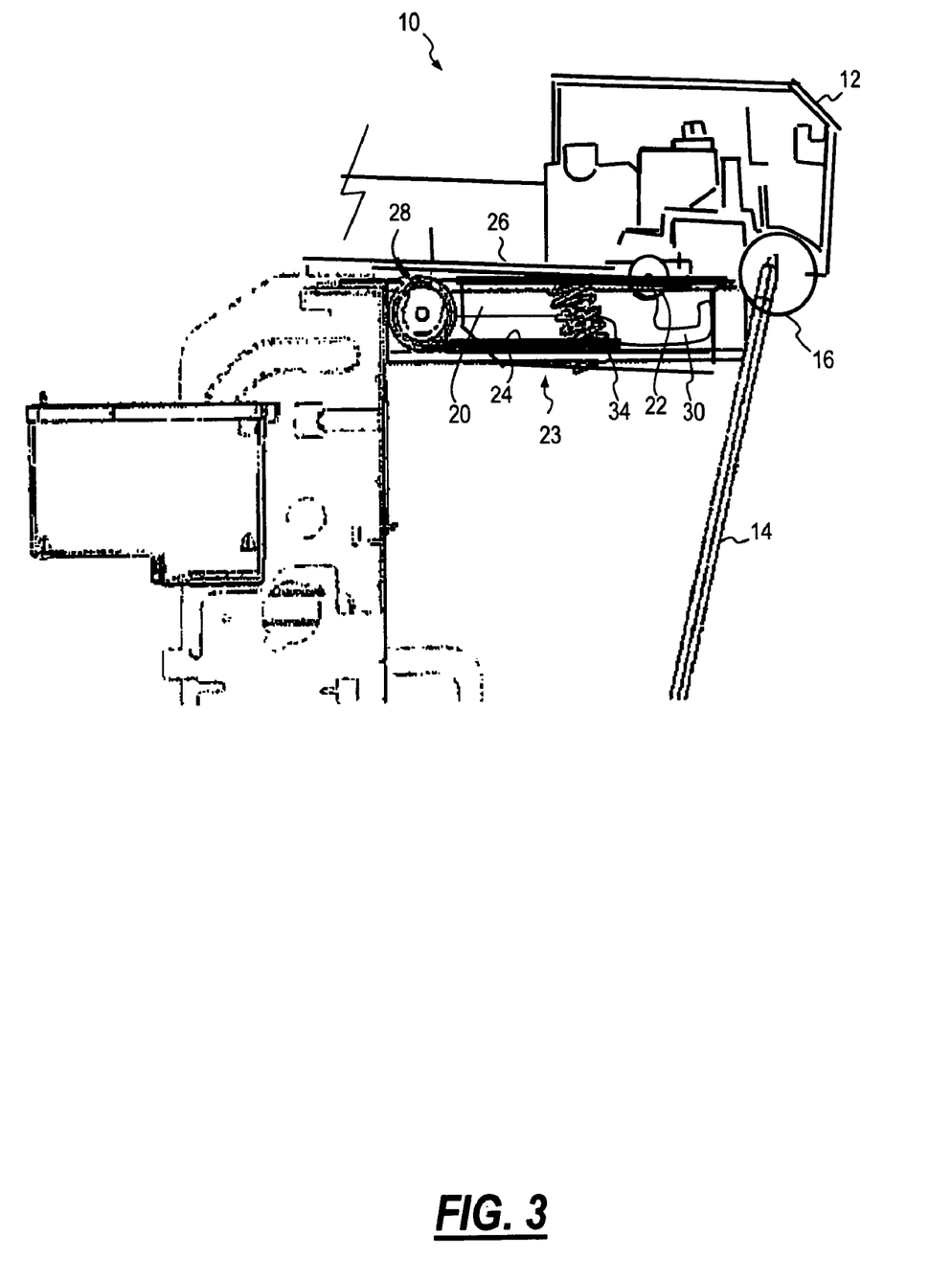
FIG. 3 is a side elevational view of the closure mechanism of FIG. 2A in a closed position.
Figure 4:
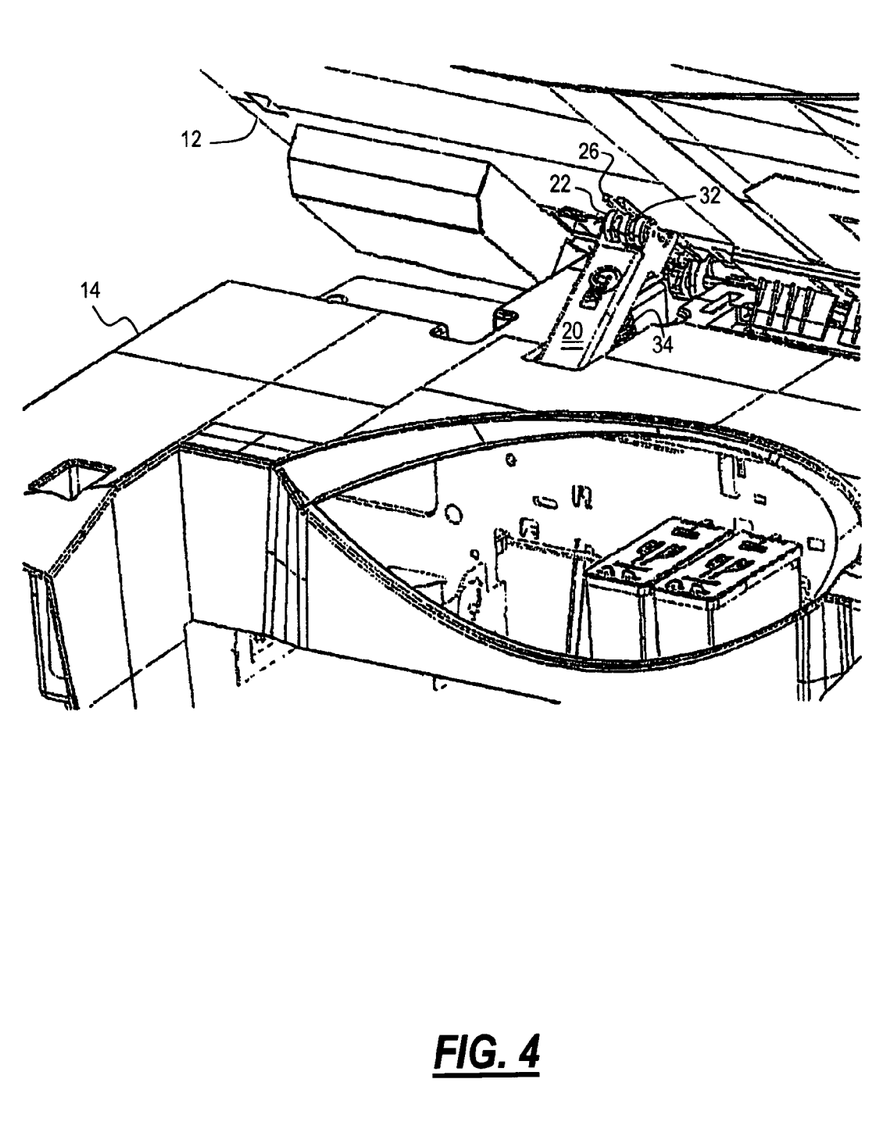
FIG. 4 is a perspective view of the closure mechanism of FIG. 2A in an open position.

With reference to FIGS. 2–4 in combination, in operation, contact element 22 engages track 26 by the force of biasing element 23 and the weight of scanner portion 12 such that the track engages grooves 32 of the contact element. In other embodiments, contact element 22 may lack grooves and may engage track 26 by fitting between or over the longitudinal projections of the track. When scanner portion 12 is in a closed position (see FIG. 3), support arm 20 is forced to a position generally parallel to the scanner portion as shown in FIG. 3. In the closed position, the weight of scanner portion 12 is sufficient to overcome the force of biasing element 23, allowing the scanner portion to rest against printer portion 14.

Figure 5:
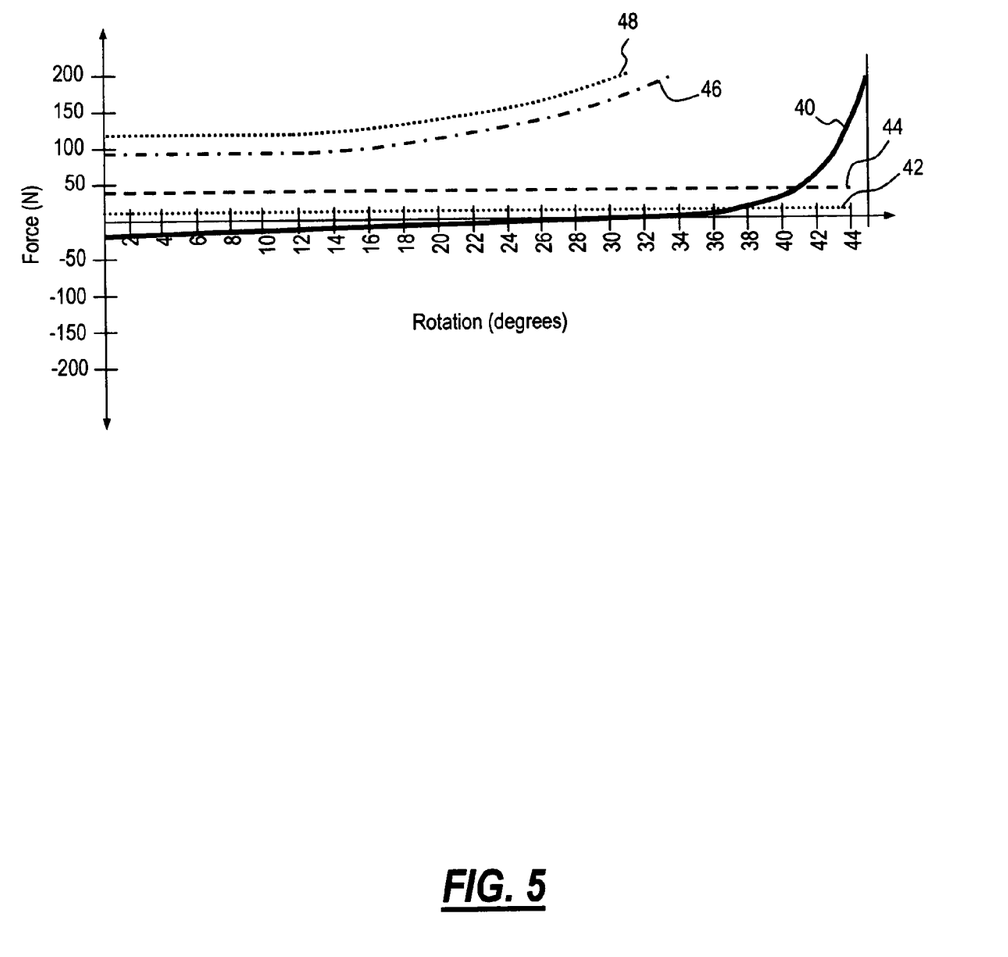
FIG. 5 is a graph of the typical forces associated with the closure mechanism of FIG. 2A.

A graph of the relative forces associated with the present invention is depicted in FIG. 5. As scanner portion 12 is pivoted from the closed position of FIG. 3 to the open position of FIGS. 2A and 2B, a user must initially overcome a portion of the weight of the scanner portion, as indicated by the negative values of force 40 of the graph of FIG. 5. With reference to FIG. 6 and FIGS. 8–11, force 40 of FIG. 5 is depicted as $F_c$. As scanner portion 12 is pivoted further, the resistance to opening as experienced by a user becomes positive at a predetermined angle of rotation and beyond it the scanner portion is assisted open by the action of biasing element 23 urging support arm 20 away from printer portion 14. In the example of force 40, this point is at about 30°, from the closed position (zero degrees).

Additional relative force values are depicted in FIG. 5 for general reference. Force 42, a constant value of about 10 N, represents an upper limit of the force necessary for the user to close scanner portion 12 once opened. Force 42 can be chosen from a range of positive values that conform to a predetermined set of criteria for a printing device 10. In the example of FIG. 5, this limit is reached at about 37° from the closed position. If rotation is allowed beyond this point, the force required by the user to close scanner portion 12 grows quickly.

Force 44 in FIG. 5 is the weight of scanner portion 12, which in this example is about 42 N. Force 44 is also depicted in FIG. 6 and FIGS. 8–11 by the force $F_s$. Forces 46 and 48 of FIG. 5 are the reaction forces of hinge 16 and support arm 20, depicted in FIG. 6 and FIGS. 8–11 as $F_h$ and $F_r$, respectively.

With reference again to FIGS. 2 and 3, as scanner portion 12 is pivoted about hinge 16 to an open position, contact element 22 moves along track 26, the contact element being urged against the track by biasing element 23. If contact element 22 is a roller element, the contact element will roll along track 26. If contact element 22 is a sliding element, the contact element will move slidably along track 26. [Support arm 20 thus cams against upper member 12]. At a predetermined maximum angle of rotation, hook portion 30 of support arm 20 engages a positive stop 36. Positive stop 36 may be an integral feature of scanner portion 12, such as a molded or molded-in component, or may be a separate component such as a bracket that is attached to the scanner portion. Hook portion 30 and positive stop 36 function to position scanner portion 12 at a predetermined angle of rotation with reference to printer portion 14. In addition, hook portion 30 and positive stop 36 prevent over-rotation of scanner portion 12, which would allow the torsion spring 24 to rotate support arm 20 to or beyond a perpendicular position with scanner portion 12, thereby preventing the support arm from being pivoted to the closed position when the scanner portion is closed. Scanner portion 12 is held in the open position by biasing element 23.

To move the scanner portion 12 from the open position of FIGS. 2A and 2B to the closed position of FIG. 3, the user initially must overcome the force of biasing element 23, as shown in line 40 of FIG. 5, at any angle greater than about 30° of rotation. As also indicated by line 40, as the angle of rotation decreases the influence of biasing element 23 also decreases, allowing scanner portion 12 to move to the closed position of about zero degrees.

As scanner portion 12 is pivoted about hinge 16 to the closed position, contact element 22 moves along track 26, the contact element being urged against the track by biasing element 23. If contact element 22 is a roller element, the contact element will roll along track 26. If contact element 22 is a sliding element, the contact element will move slidably along track 26. [Support arm 20 thus cams against upper member 12]. In the closed position, scanner portion 12 rests atop printer portion 14 and support arm 20 is positioned generally parallel to the scanner portion.

A second resilient element, coil spring 34, optionally may be coupled between support arm 20 and printer portion 14, as shown in FIGS. 2 and 3. Aside from a coil spring 34, any conventional resilient element may be used, including, but not limited to, Belleville washers, a leaf spring and elastic material.

Spring 34 is minimally loaded when scanner portion 12 is in the open position, and its force is greatest when the scanner portion is in the closed position. Spring 34 thus functions to reduce the effective weight of scanner portion 12 as perceived by the user when opening and closing the scanner portion. In addition, spring 34 aids in preventing scanner portion 12 from closing too quickly, which might damage any of the scanner portion, printer portion 14 or hinge 16. Spring 34 also serves to impart a smooth and consistent pivoting motion of scanner portion 12 about hinge 16.

As can be seen in FIGS. 2 and 3, contact element 22 is biased against track 26 by springs 24, 34. The force of coil spring 34 is additive to that of the force exerted by spring 24. Thus, a user closing scanner portion 12 must overcome the force of both springs 24 and 34. Likewise, the additive forces of springs 24, 34 make the effective weight of scanner portion 12 lighter than the effective weight of the scanner portion with spring 24 alone, as the scanner portion is pivoted from the closed position of FIG. 3 to the open position of FIGS. 2A and 2B.

Figure 6:
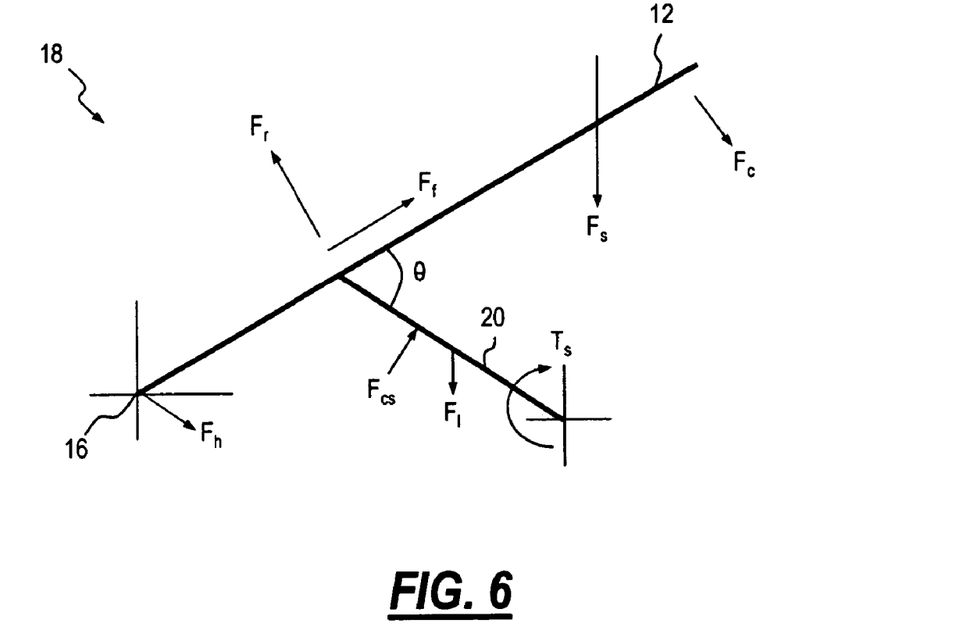
FIG. 6 is a free body diagram of the closure mechanism of FIGS. 2A and 2B

A free body diagram of support 18 according to an embodiment of the present invention is shown in FIG. 6, representing forces associated with scanner portion 12 and support arm 20. $F_h$ is the reaction force of scanner portion 12 at hinge 16, $F_s$ is the weight force of scanner portion 12, $F_l$ is the weight force of support arm 20, $F_r$ is the reaction force of support arm 20 in scanner portion 12, $F_f$ is the frictional force between contact element 22 and track 26, $F_c$ is the force exerted by a user, $F_{cs}$ is the force exerted by second resilient element 34, $T_s$ is the torque required to support scanner assembly 12, and θ is the angle of support arm 20 with respect to scanner portion 12.

Figure 7:
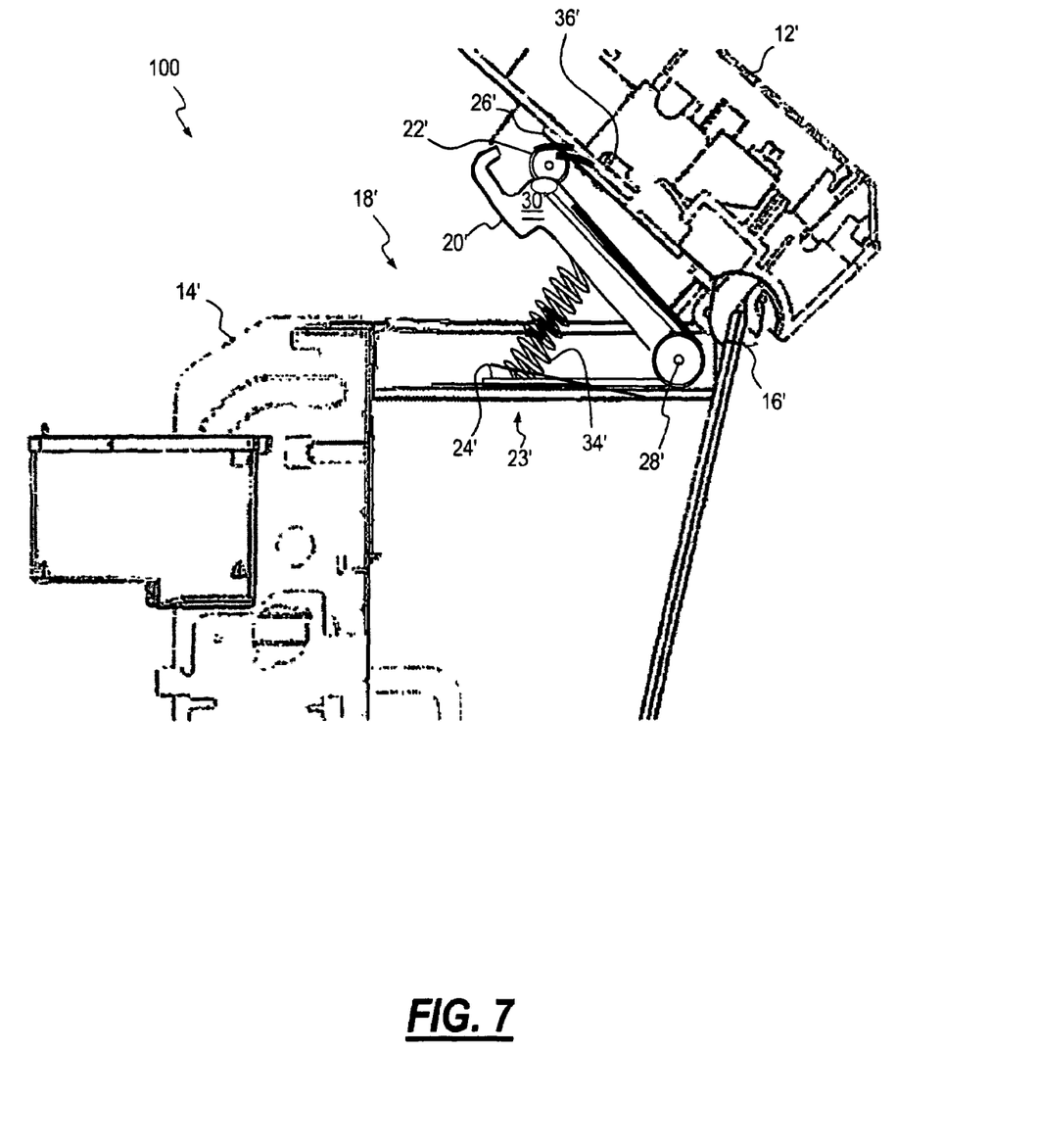
FIG. 7 is a side elevational view of the closure mechanism of an alternate embodiment of the present invention in an open position.

With regard to FIG. 7, in an alternate embodiment of the present invention a closure, generally designated 100, includes a support arm 20' pivotally connected to printer portion 14'. Support arm 20' is oriented generally perpendicular to hinge 16' such that hook portion 30' is positioned away from the hinge and pivot 28' is positioned toward the hinge. Support arm 20' thus pivots in the same direction of rotation as scanner portion 12'. Biasing element 23, contact element 22', track 26', hook 30', and positive stop 36' all function in the manner previously discussed for the embodiment of FIGS. 2A and 2B. Coil spring 34' optionally may be included, also functioning in the manner previously described for the embodiment of FIGS. 2A and 2B.

Figure 8:
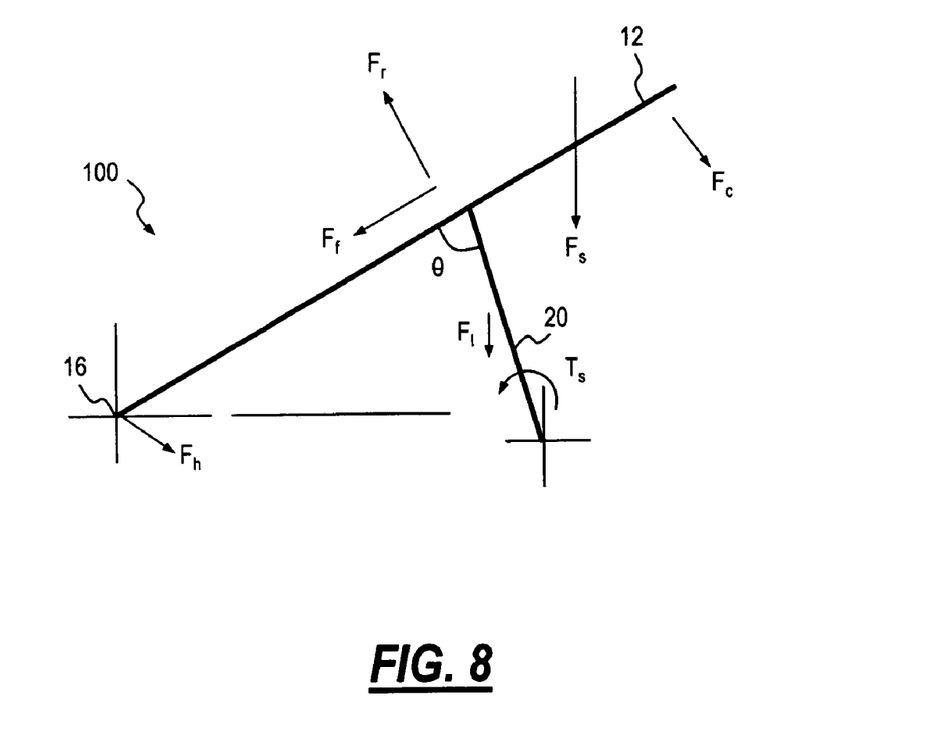
FIG. 8 is a free body diagram of the closure mechanism of FIG. 7.

A free body diagram of support 100 of FIG. 7 is shown in FIG. 8, representing forces associated with scanner portion 12' and support arm 20'. $F_h$ is the reaction force of scanner portion 12' at hinge 16', $F_s$ is the weight force of scanner portion 12', $F_l$ is the weight force of support arm 20', $F_r$ is the reaction force of support arm 20' in scanner portion 12', $F_f$ is the frictional force between contact element 22' and track 26', $F_c$ is the force exerted by a user, $T_s$ is the torque required to support scanner assembly 12', and θ is the angle of support arm 20' with respect to scanner portion 12'.

Figure 9:
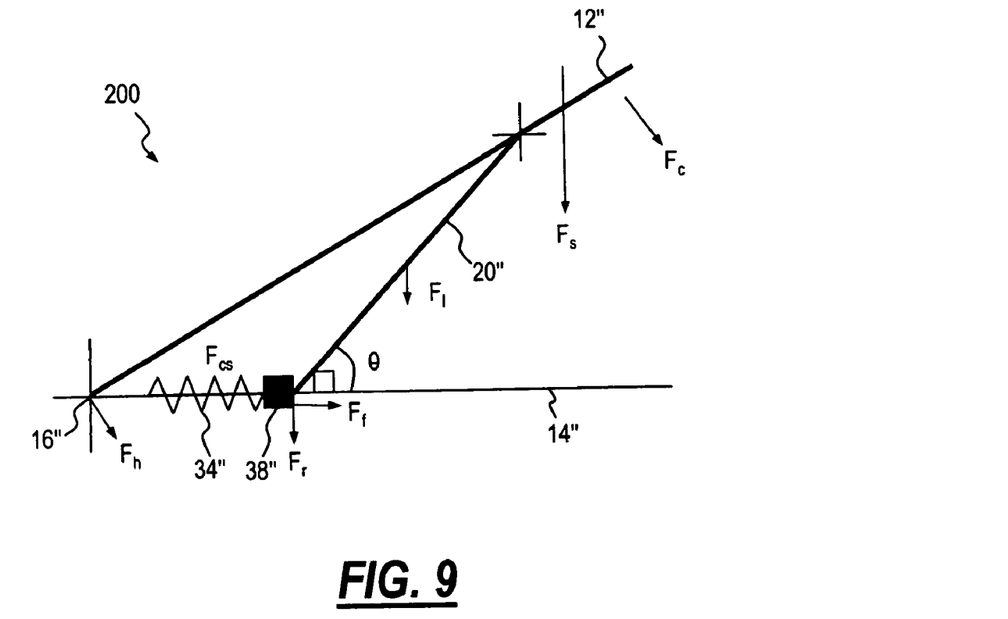
FIG. 9 is a free body diagram of a closure mechanism of a third embodiment of the present invention.

As shown as a free body diagram in FIG. 9, in an alternate embodiment of the present invention, a closure device generally designated 200, utilizes a conventional pneumatic element 38", such as a piston. The support arm 20" is pivotally attached to scanner portion 12" and slides or rolls along printer portion 14". Spring 34" extends between printer portion 14" and arm 20". $F_h$ is the reaction force of scanner portion 12" at hinge 16", $F_s$ is the weight force of the scanner portion, $F_l$ is the weight force of support arm 20", $F_r$ is the reaction force of support arm 20" against the printer portion 14", $F_f$ is the frictional force between contact element 22" and track 16", $F_c$ is the force exerted by a user against the scanner portion, $F_{cs}$ is the force exerted by an optional second resilient element 34", and θ is the angle made by support arm 20" with printer portion 14" extending between the printer portion and arm 20".

Pneumatic piston 38 of support 200 moves in a linear direction along the printer portion 14" to urge support arm 20", pivotally attached to scanner portion 12". A resilient element 34" optionally may be included, such as a compression spring 34". Closure 200 may be positioned to be forwardly-hinged or reversely-hinged in the same manner as supports 18, 100 of FIGS. 2 and 7, respectively.

Figure 10:
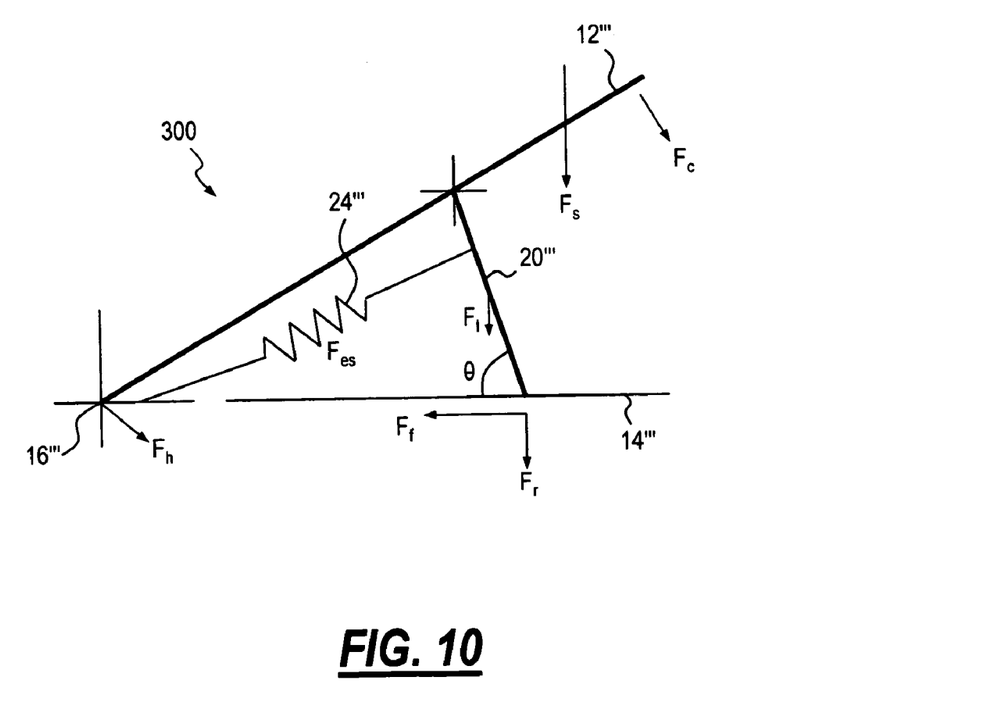
FIG. 10 is a free body diagram of a closure mechanism of a fourth embodiment of the present invention.

In another alternate embodiment of the present invention, shown as a free body diagram in FIG. 10, a closure device generally designated 300 utilizes an extension spring 24''' for a resilient element. In this embodiment, support arm 20''' is pivotally attached to scanner portion 12''' and slides against a track mounted on printer portion 14''' to pivot the scanner portion to an open position. The force exerted by spring 24''' is represented by $F_{es}$ and urges arm 20''' to rotate clockwise. $F_h$ is the reaction force of the scanner portion 12''' at hinge 16''', $F_s$ is the weight force of scanner portion 12''', $F_c$ is the weight force of support arm 20''', $F_r$ is the reaction force of support arm 20''' in printer portion 14''', $F_f$ is the frictional force between contact element 22''' and track 26''', $F_c$ is the force exerted by a user, and θ is the angle of support arm 20''' with respect to printer portion 14'''. Support 300 may be positioned to be forwardly-hinged or reversely-hinged in the same manner as supports 18, 100 of FIGS. 2 and 7, respectively.

Figure 11:
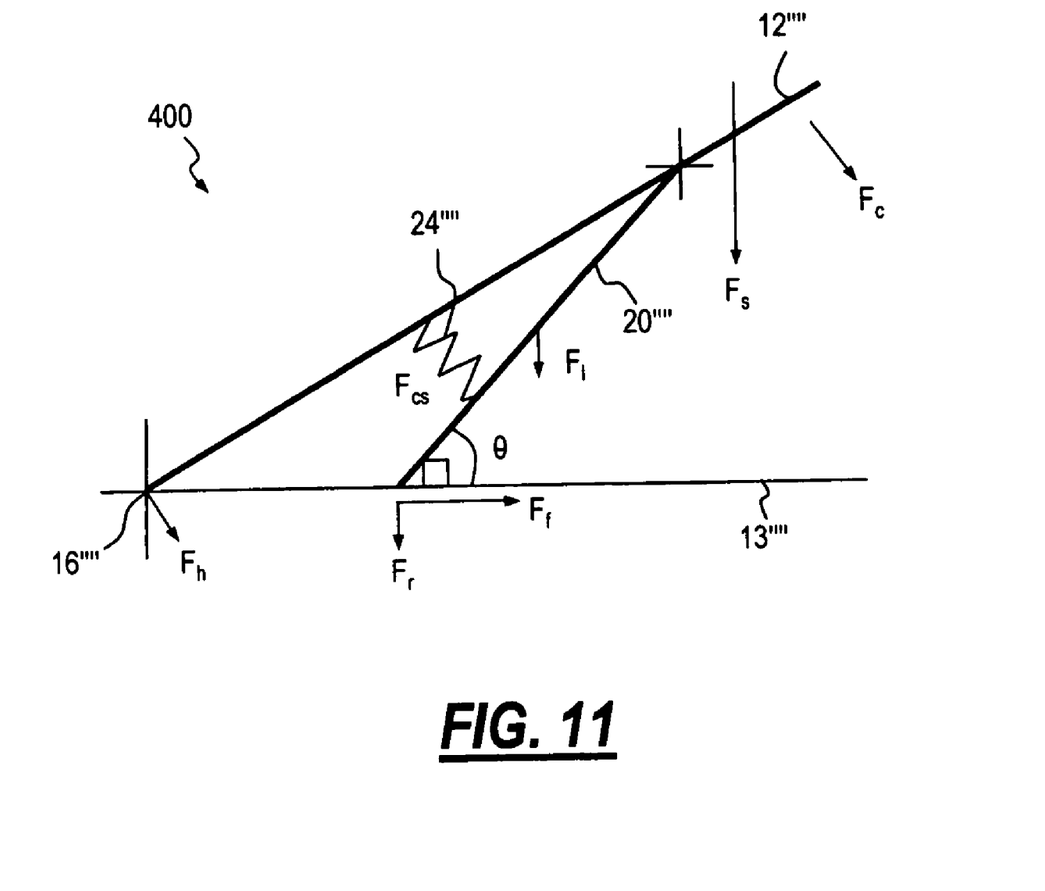
FIG. 11 is a free body diagram of a closure mechanism of a fifth embodiment of the present invention.

In another alternate embodiment of the present invention, shown as a free body diagram in FIG. 11, a closure generally designated 400 utilizes a compression spring for resilient element 24'''' that extends between arm 20'''' and scanner portion 12''''. Arm 20'''' is pivotally attached to scanner portion 12'''' and slides or rolls against printer portion 14''''. The force exerted by spring 24'''' is represented by $F_{cs}$. $F_h$ is the reaction force of printer portion 14'''' at hinge 16'''', $F_s$ is the weight force of scanner portion 12'''', $F_l$ is the weight force of support arm 20'''' on printer portion 14'''', $F_r$ is the reaction force of support arm 20'''' against printer portion 14'''', $F_f$ is the frictional force between contact element 22'''' and track 26'''', $F_c$ is the force exerted by a user, and θ is the angle support arm 20'''' makes with printer portion 14''''. Support 400 may be positioned to be forwardly-hinged or reversely-hinged in the same manner as supports 18, 100 of FIGS. 2 and 7, respectively.

Although structural details of supports 200, 300 and 400 are not shown, the structural details of these alternate embodiments are sufficiently similar to supports 18 and 100 that the free body diagrams of FIGS. 9, 10 and 11 and associated discussion may be readily interpreted with general reference to the discussion for supports 18 and 100.

Supports 18, 100, 200, 300 and 400 may each be arranged in a generally reverse order in alternate embodiments such that track 26 and positive stop 36 are disposed on printer portion 14 and support arm 20 and associated components such as resilient elements 24, 34 are attached to scanner portion 12. Operation of such reverse-order embodiments is otherwise similar to that previously discussed for supports 18, 100, 200, 300 and 400.

While this invention has been shown and described with respect to a detailed embodiment thereof, it will be understood that various changes in form and detail thereof may be made without departing from the scope of the claims of the invention. For example, supports 18, 100, 200, 300 and 400 have been disclosed with reference to use with an AIO device. However, supports 18, 100, 200, 300 and 400 may be used with any hinged device. Thus, supports 18, 100, 200, 300 and 400 may be used with such hinged devices as, without limitation, printers, photocopiers, and imaging devices. In addition, supports 18, 100, 200, 300 and 400 may be used with hinged portions of various household, commercial, and industrial devices such as electrical, mechanical and electromechanical equipment.

What is claimed is:

1. A closure mechanism for a hinged device having an upper member pivotally attached to a lower member, comprising:
   a support arm pivotally attached to one of the upper member and the lower member; and
   a biasing element adapted to urge a free end of the support arm against the other member, thereby urging the upper member to pivot to an open position whereby the support arm cams against the other member as the other member pivots, wherein the upper member is a scanner assembly and the lower member is a printer assembly of an all-in-one device, wherein the support arm includes a hook member shaped to engage the other member, thereby preventing over-rotation of the support arm relative to the other member, and further comprising a positive stop formed in the other member shaped to receive the hook member.

2. A closure mechanism for a hinged device having an upper member pivotally attached to a lower member, comprising:
   a support arm pivotally attached to the lower member; and
   a biasing element adapted to urge the support arm against the upper member, thereby urging the upper member to pivot to an open position whereby the support arm cams against the upper member as the upper member pivots, wherein the upper member is a scanner assembly and the lower member is a printer assembly of an all-in-one device, wherein the biasing element includes a pair of resilient elements cooperating to urge the support arm to pivot to open the upper member, and wherein one of the resilient elements is a compression spring.

3. A closure mechanism for a hinged device having an upper member and a lower member, comprising:
   a track and a positive stop disposed on the upper member;
   a support arm having a hook member and being pivotally attached to the lower member;
   a roller element rotatably attached to the support arm; and
   a torsion spring adapted to urge the roller element against the track, thereby urging the upper member to pivot until the hook member engages the positive stop when the upper member reaches a predetermined pivot angle relative to the lower member, wherein the upper member is a scanner assembly and the lower member is a printer assembly of an all-in-one device, and further comprising a second resilient element cooperating with the torsion spring to urge the support arm to pivot to open the upper member, wherein the second resilient element is a compression spring.

* * * * *